(12) United States Patent
Conde

(10) Patent No.: US 9,832,970 B1
(45) Date of Patent: Dec. 5, 2017

(54) PET TOY

(71) Applicant: Michael Conde, Shepherdsville, KY (US)

(72) Inventor: Michael Conde, Shepherdsville, KY (US)

( * ) Notice: Subject to any disclaimer, the term of this patent is extended or adjusted under 35 U.S.C. 154(b) by 280 days.

(21) Appl. No.: 14/830,110

(22) Filed: Aug. 19, 2015

Related U.S. Application Data

(60) Provisional application No. 62/039,406, filed on Aug. 19, 2014.

(51) Int. Cl.
| | | |
|---|---|---|
| A01K 5/00 | (2006.01) | |
| A01K 5/01 | (2006.01) | |
| A01K 5/02 | (2006.01) | |
| A01K 15/02 | (2006.01) | |

(52) U.S. Cl.
CPC ............ *A01K 5/0114* (2013.01); *A01K 5/025* (2013.01); *A01K 15/026* (2013.01)

(58) Field of Classification Search
None
See application file for complete search history.

(56) References Cited

U.S. PATENT DOCUMENTS

| | | | |
|---|---|---|---|
| 5,499,403 A * | 3/1996 | Harrigan | A41D 27/208 2/247 |
| 5,947,061 A | 9/1999 | Markham et al. | |
| 6,557,494 B2 | 5/2003 | Pontes | |
| 6,688,258 B1 * | 2/2004 | Kolesar | A01K 5/0114 119/702 |
| 6,941,895 B2 | 9/2005 | St. Pierre | |
| 6,983,722 B2 | 1/2006 | Tepper et al. | |
| 7,246,574 B2 | 7/2007 | Renforth | |
| 7,600,488 B2 | 10/2009 | Mann | |
| 7,832,362 B2 | 11/2010 | DeGhionno | |
| 7,870,839 B2 | 1/2011 | Sacra | |
| 8,240,273 B2 * | 8/2012 | Benson | A01K 5/0114 119/51.01 |
| 8,312,844 B2 | 11/2012 | Mann | |
| 8,393,300 B2 | 3/2013 | Markham et al. | |
| 8,516,977 B2 | 8/2013 | Shatoff et al. | |

* cited by examiner

*Primary Examiner* — Sarah McPartlin
(74) *Attorney, Agent, or Firm* — Law Office of J.L. Simunic; Joan L. Simunic

(57) ABSTRACT

The present development is a pet toy with a hidden cavity for a treat or similar enticement for the pet. The hidden cavity is preferably enclosed within a plunger-type device so the pet must extract the plunger to retrieve the treat.

18 Claims, 10 Drawing Sheets

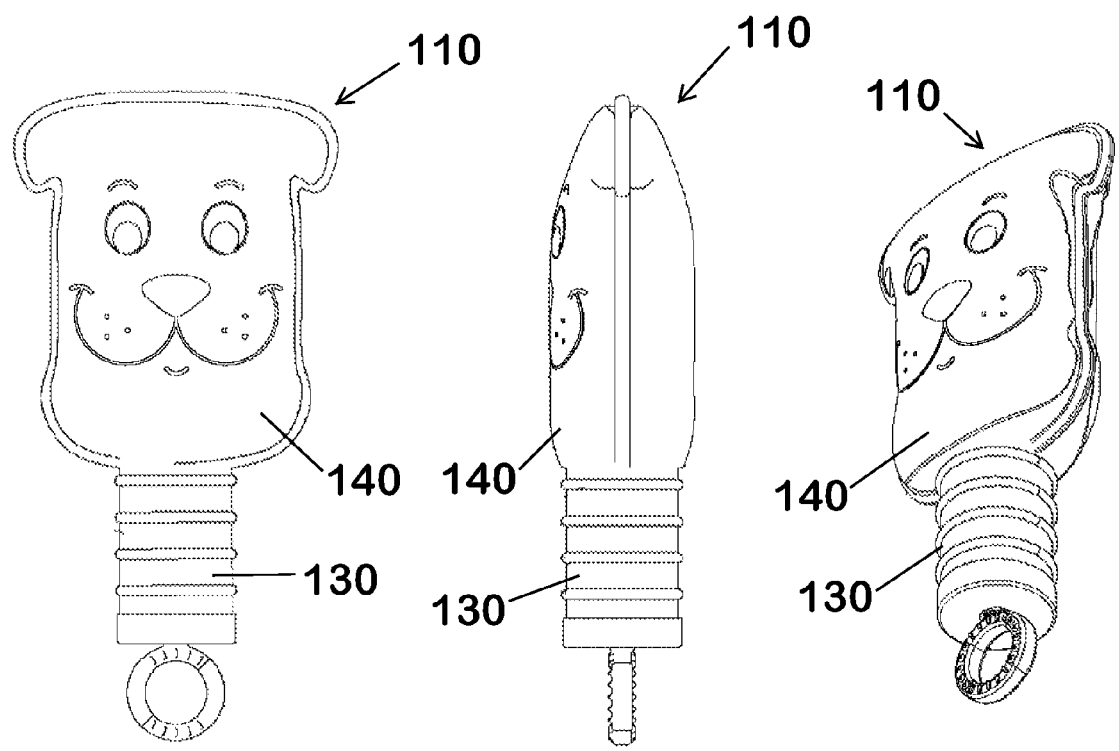

US 9,832,970 B1

PET TOY

CROSS-REFERENCE TO PRIOR APPLICATIONS

The present application claims priority to previously filed U.S. Patent Application 62/039,406 filed on 19 Aug. 2014, and incorporated herein by reference.

BACKGROUND

The present development is a toy for a pet comprising a soft-body housing and at least one hidden cavity for accommodating a treat. Optionally, the toy may include a squeaker or similar noise making object to maintain the attention of the pet.

Household pets enjoy playing with toys. Most toys are designed to allow the pet to chew on the toy, or to provide entertainment while batting the toy around. As pets spend more time confined in relatively small spaces, such as within houses or residential yards, their need for intellectual stimulation increases. However, few toys are designed to be intellectually challenging for the pet.

The present development addresses this issue by providing a pet toy design that challenges the pet to determine how to access a treat hidden within the toy housing.

SUMMARY OF THE PRESENT INVENTION

The present development is a pet toy with a hidden cavity for a treat or similar enticement for the pet. The hidden cavity is preferably enclosed within a plunger-type device so the pet must extract the plunger to retrieve the treat. Preferably, the toy comprises a soft-body, such as a cloth, fabric, soft plastic, or rubber material, that can be easily gripped in the mouth of a pet. Optionally, the toy may include a hidden noise-making element concealed within the body of the toy.

BRIEF DESCRIPTION OF THE FIGURES

FIGS. 2A-C are views of the pouch or body of the toy of FIG. 1, wherein FIG. 2A is a front view, FIG. 2B is a side view, and FIG. 2C is a bottom perspective view;

FIGS. 3A-C are views of the treat dispenser of the toy of FIG. 1, wherein FIG. 3A is a front view, FIG. 3B is a side view, and FIG. 3C is a top perspective view;

FIGS. 5A-C are views of the treat dispenser housing of the toy of FIG. 1, wherein FIG. 5A is a front view, FIG. 5B is a side view, and FIG. 5C is a top perspective view;

FIGS. 6A-C are views of the gripping device of the toy of FIG. 1, wherein FIG. 6A is a front view, FIG. 6B is a side view, and FIG. 6C is a bottom perspective view;

FIGS. 8A-C are views of the gripping device of the toy of FIG. 1 showing a second alternative means for attaching the gripping device to the treat dispenser, wherein FIG. 8A is a perspective view of the toy with the lid opened, FIG. 8B is a partial side view of the toy with the lid closed, and FIG. 8C is a partial side view of the toy with the lid opened;

FIGS. 9A-C are views of an optional squeaker element of the toy of FIG. 1, wherein FIG. 9A is a front view, FIG. 9B is a side view, and FIG. 9C is a top perspective view; and, FIGS. 10 A-C are views of a toy made according to the present invention wherein the treat dispenser is partially exposed, wherein FIG. 10A is a front view, FIG. 10B is a side view, and FIG. 10C is a bottom perspective view.

DETAILED DESCRIPTION OF THE INVENTION

Figure 1:
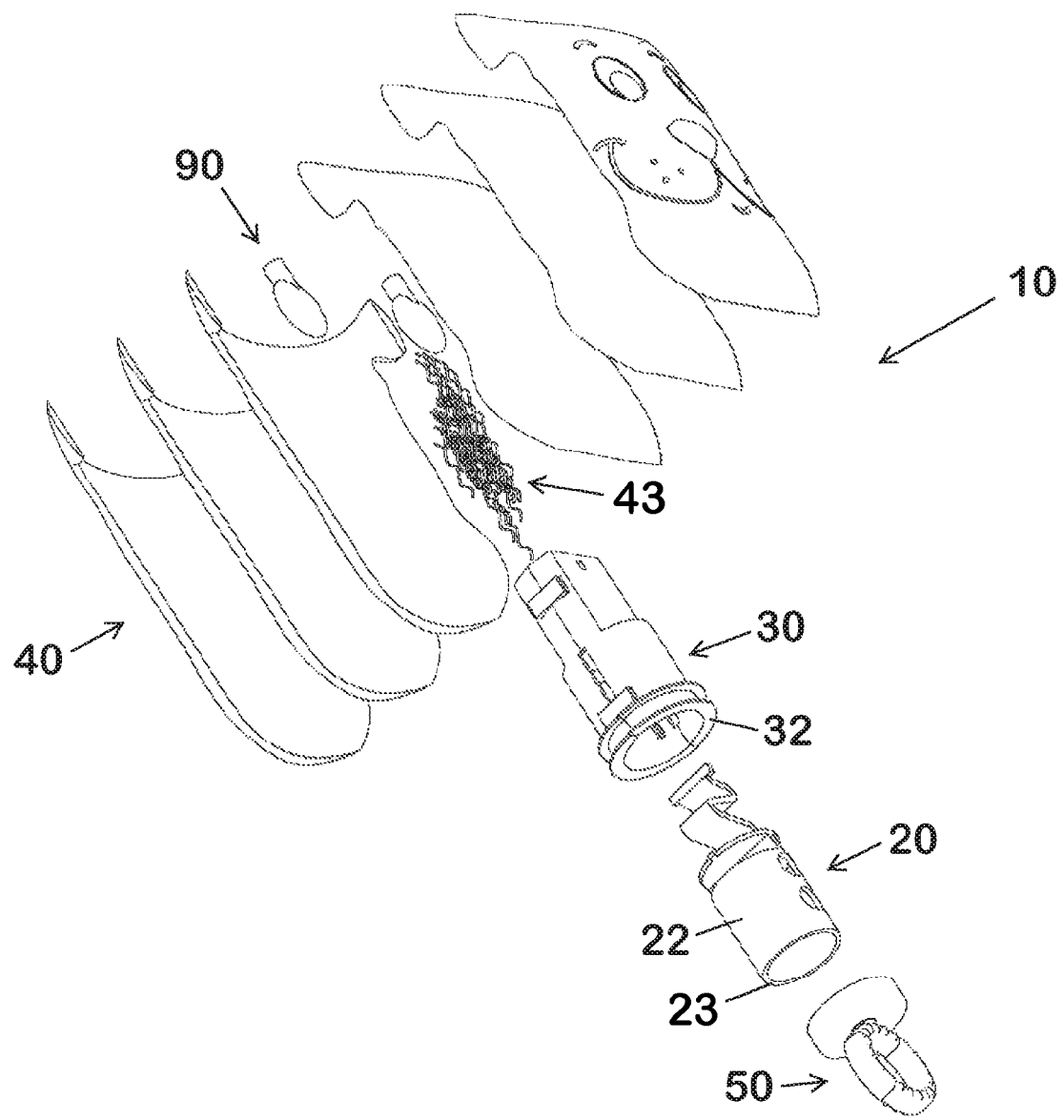
FIG. 1 is an exploded view of the toy of the present invention.

The following description is intended to provide the reader with a better understanding of the invention. The description is not intended to be limiting with respect to any element not otherwise limited within the claims. For example, the present invention will be described in the context of use as a dog toy, but the teachings herein are not limited to use by dogs.

As shown in FIGS. 1-10, the present development is a pet toy 10 comprising a treat dispenser 20, a treat dispenser housing 30, and a flexible bodied cover 40 to conceal the treat dispenser and housing when in a closed position. The treat dispenser 20 includes a tugging ring 50 so a pet may "open" the dispenser and expose the treat compartment 22 of the treat dispenser 20.

More specifically, as shown in FIG. 1, the present development comprises a treat dispenser housing 30 that is preferably positioned in the interior of a soft or flexible body or pouch 40. The treat dispenser housing 30 must be affixed within the body 40 such that a first end 32 is exposed to receive the treat dispenser 20. In a preferred embodiment, the treat dispenser housing is maintained in position within the body by fabric stuffing 43 or similar packing material. A pet-engaging device 50, such as tugging ring is positioned on a first end 24 of the treat dispenser 20, such that the tugging ring is located on the exterior of the flexible body when the dispenser is in a closed position. Optionally, the pet toy 10 may include one or more squeakers 90 or similar noise making elements fixedly attached within the body.

Figure 2A:
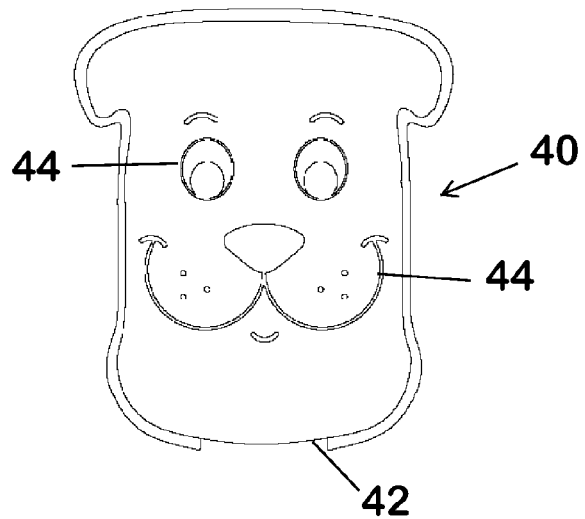
Figure 2B:
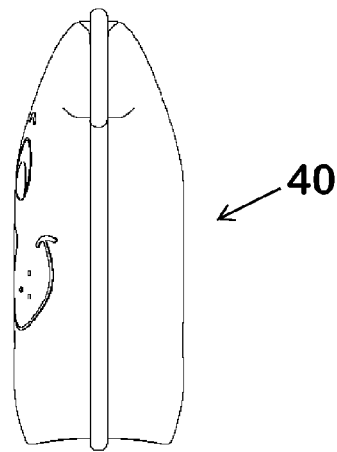
Figure 2C:
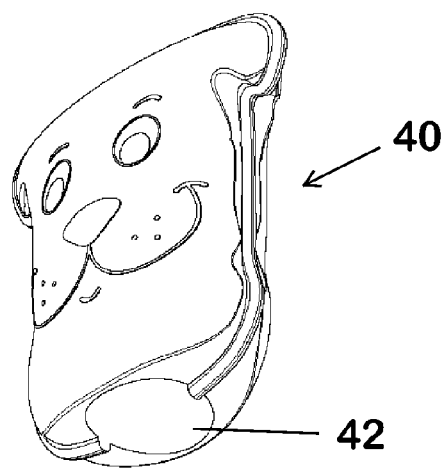

As shown in FIG. 2, the body 40 is essentially a pouch with an opening 42 on one end to receive the treat dispenser housing 30. The opening should be sized to retain at least some portion of the treat dispenser housing 30 within the interior of the pouch but to allow the treat dispenser 20 to be exposed on the exterior of the pouch. Optionally, the pouch may have decorative features 44, but this decoration is not relevant to the functionality of the invention. The pouch may be made from, among other materials, nylon, plastic, rubber, synthetic rubber, metal, wood.

Figure 3A:
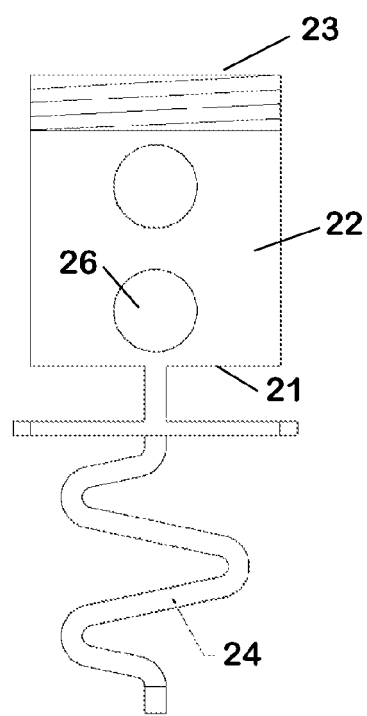
Figure 3B:
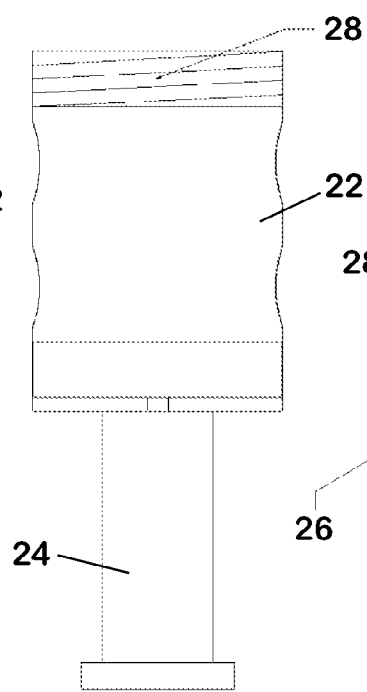
Figure 3C:
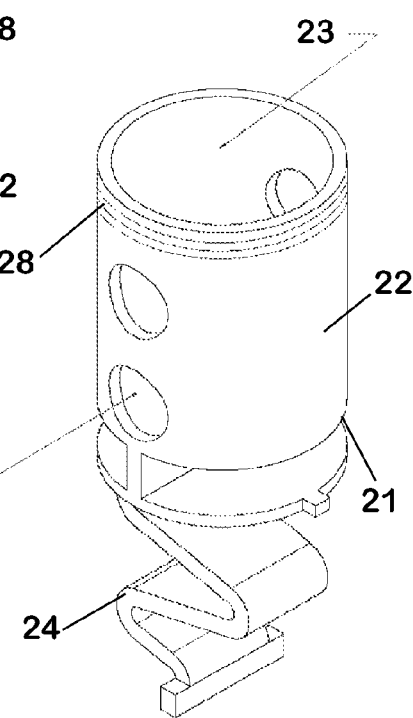
Figure 4:
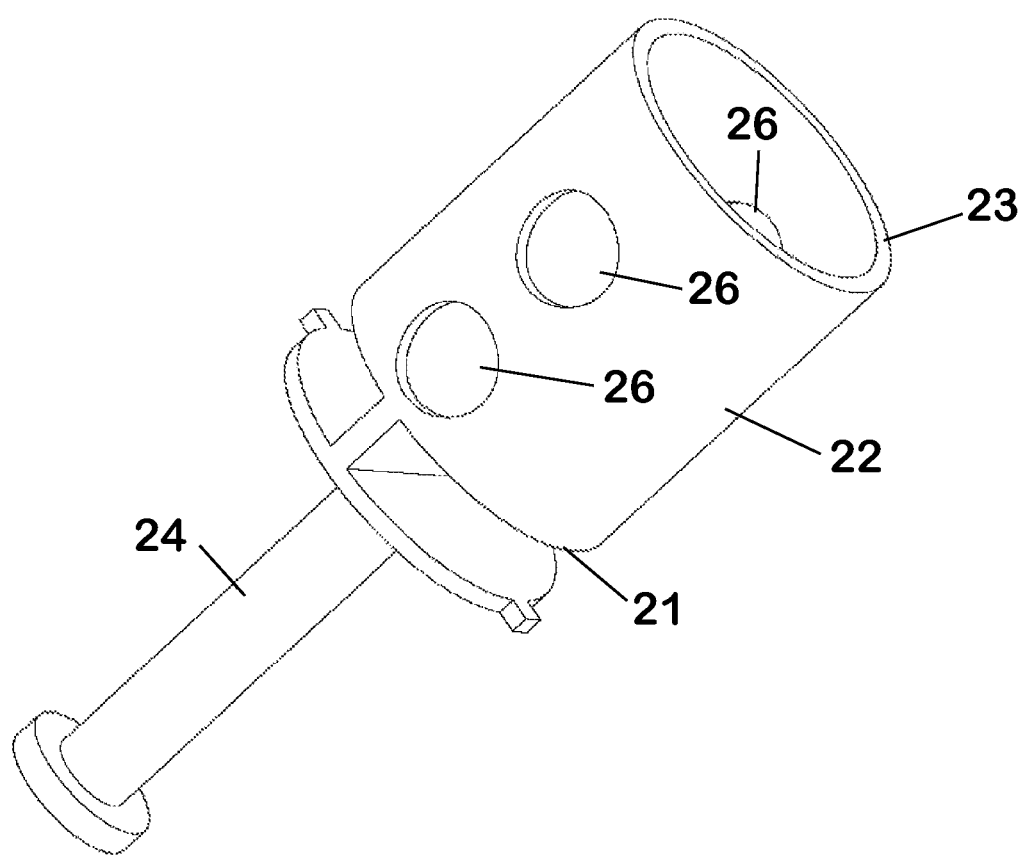
FIG. 4 is a view of the treat dispenser of the toy of FIG. 1 with an alternative rod.

As shown in FIGS. 3 and 4, the treat dispenser 20 comprises a treat compartment or vessel 22 having a closed end 21 and an opened end 23. A flexible attachment means 24, such as a sulcated-style spring or pliable rod, is fixedly attached at the closed end 21. The opened end 23 is capable of receiving pet treats or similar rewards. The vessel must include at least one aperture 26 which can be exposed when the treat dispenser 20 is extracted from the treat dispenser housing 30. In a preferred embodiment, the treat dispenser 20 includes at least two apertures 26 for retrieving treats. The opened end 23 of the treat dispenser 20 must further include a means 28 for engaging the tugging ring, such as screw threading. The treat dispenser 20 may be made from, among other materials, nylon, plastic, rubber, synthetic rubber, metal, wood.

Figures 5A, 5B, 5C:
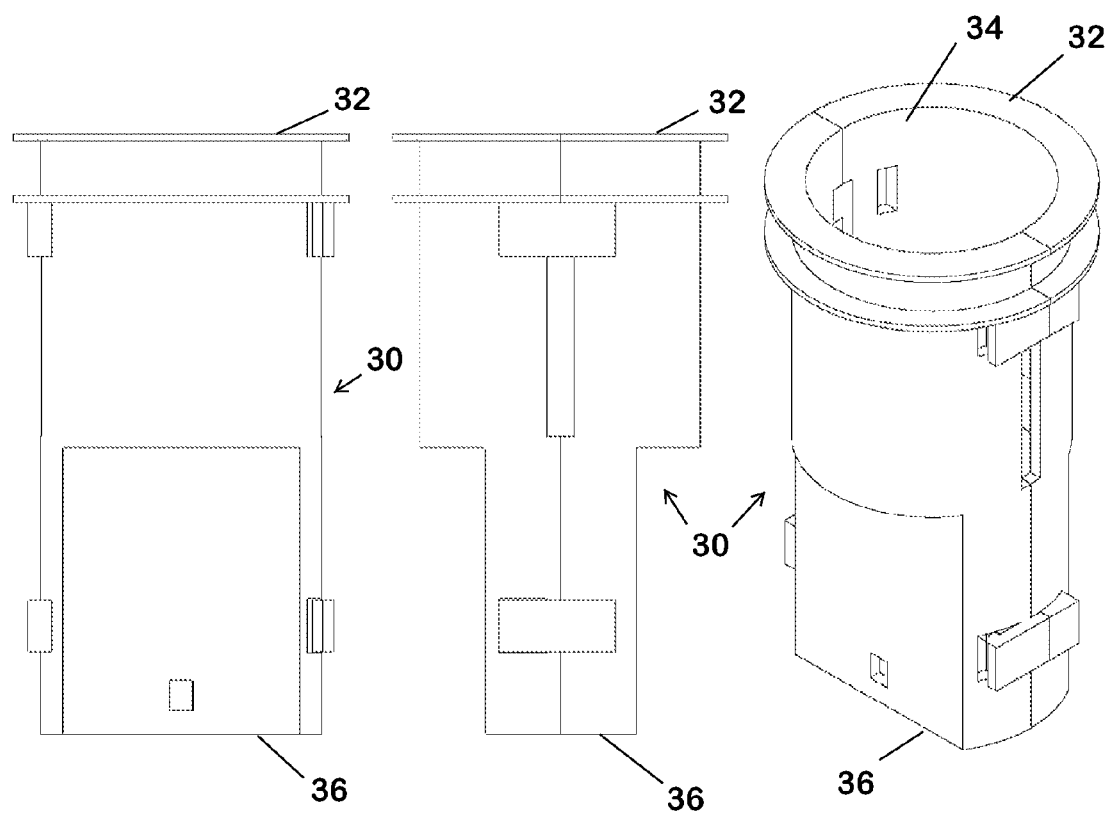

As shown in FIG. 5, the treat dispenser housing 30 comprises a hollow chamber 34 capable of reversibly receiving the treat dispenser 20. The treat dispenser housing 30 includes a spring end 36 which is intended to receive and retain the flexible attachment means of the treat dispenser 24. An opposing end of the housing is open and sized to receive the vessel 22 of the treat dispenser. When the treat dispenser is properly affixed within the housing, the flexible attachment means 24 may be extended to allow the vessel 22 to be reversibly extracted from the housing 30 while maintaining the flexible attachment means firmly in its mounting. The treat dispenser housing may be made from, among other materials, nylon, plastic, rubber, synthetic rubber, metal, wood.

Figure 6A:
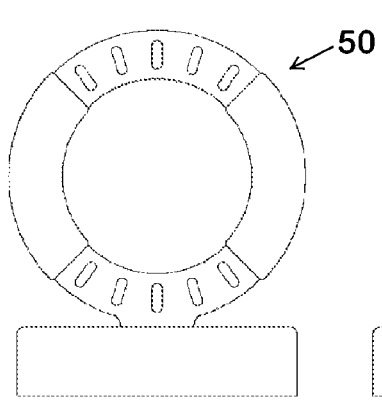
Figure 6B:
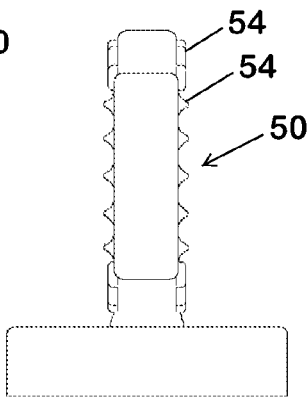
Figure 6C:
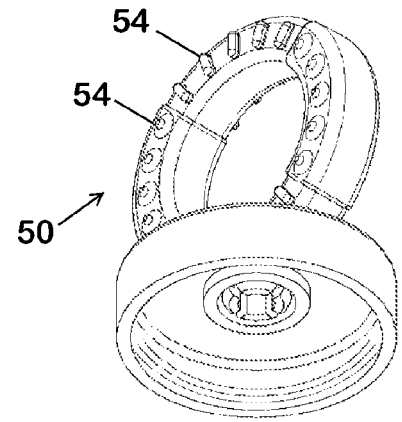
Figure 7:
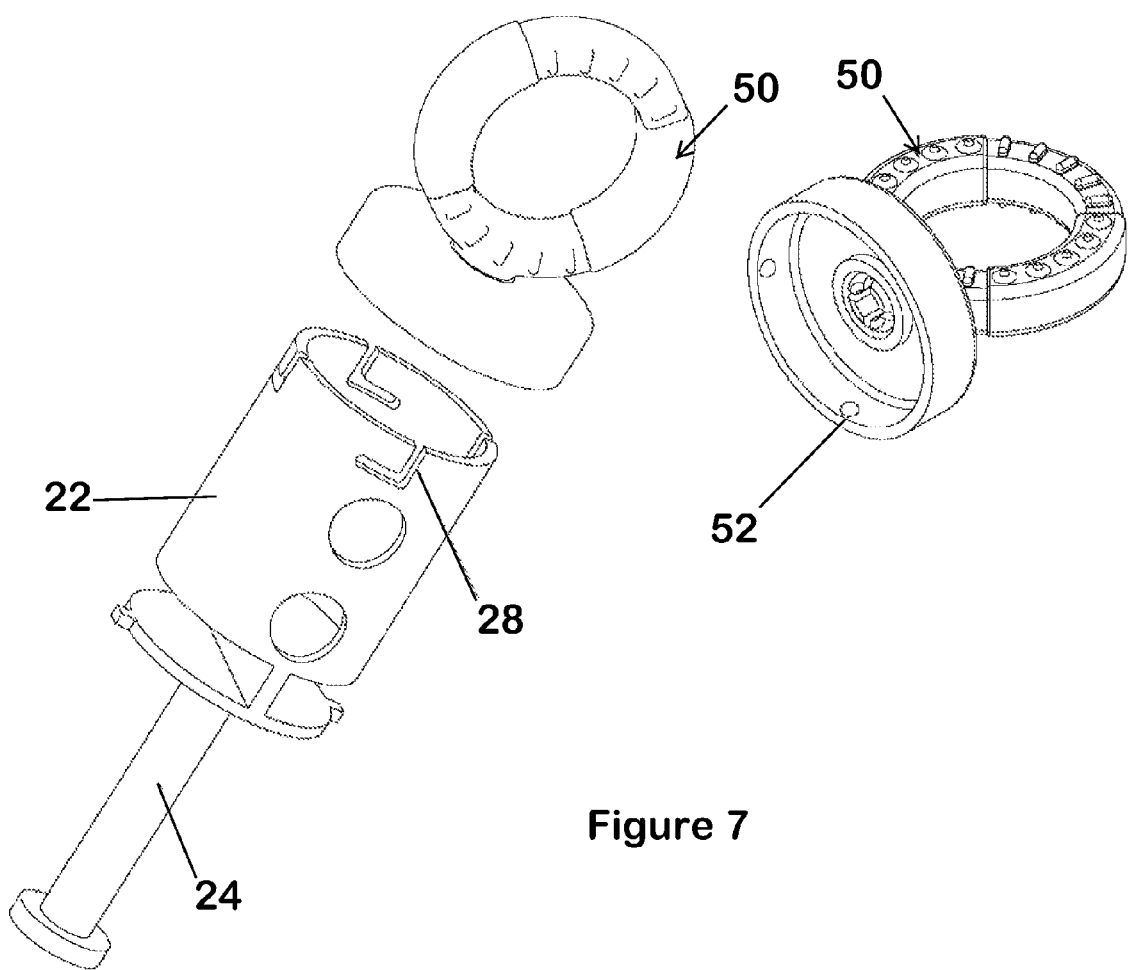
FIG. 7 is a view of the gripping device of the toy of FIG. 1 showing a first alternative means for attaching the gripping device to the treat dispenser.
Figures 8A, 8B, 8C:
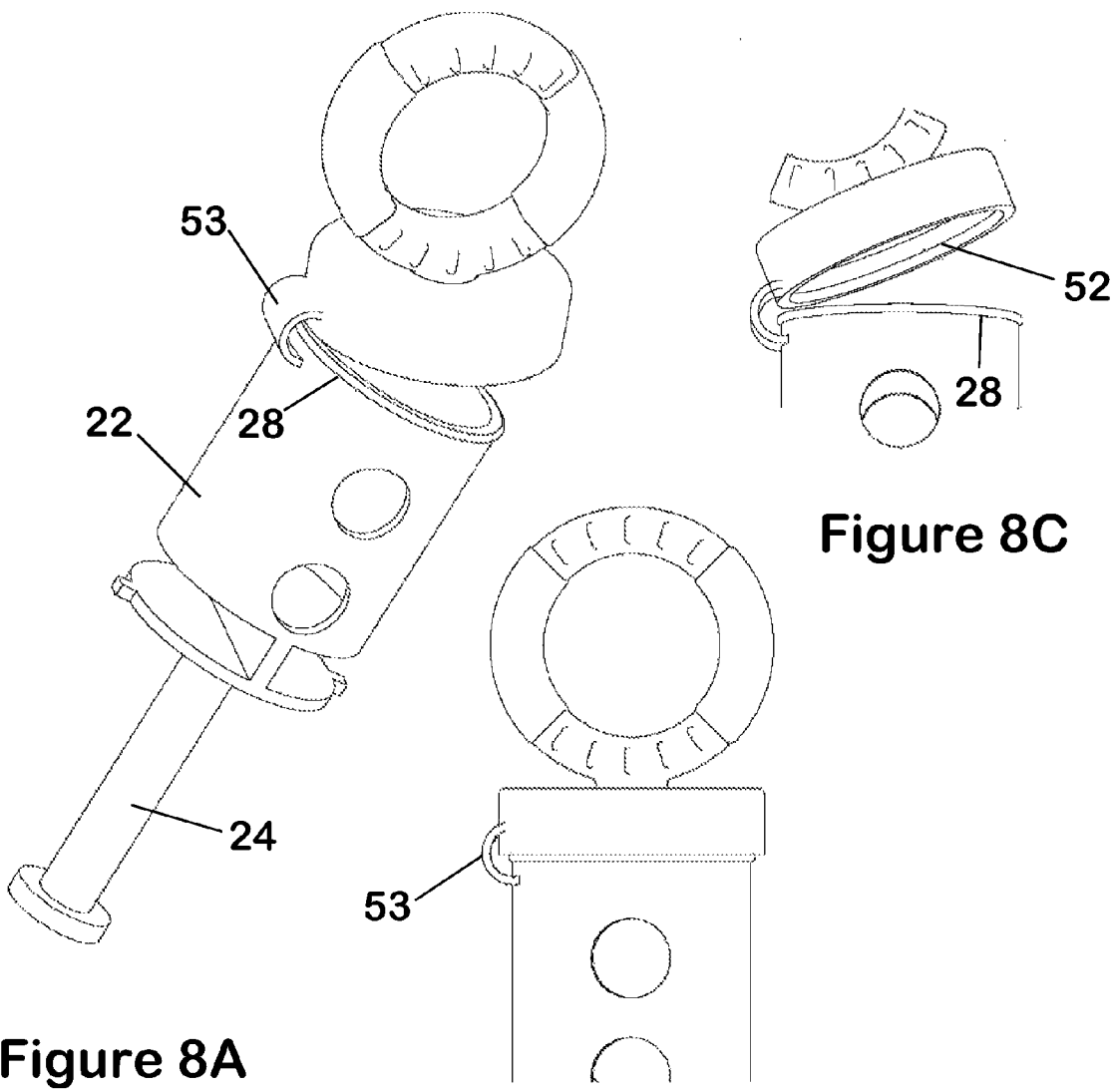

In order to allow a pet to extract the vessel 22 of the treat dispenser from the treat dispenser housing 30 and to access a treat from within the treat dispenser, a tugging device 50, such as a ring as shown in FIG. 6, is preferably attached to the vessel of the treat dispenser. As shown in FIGS. 6-8, in a preferred embodiment, the tugging device 50 includes a means 52 for engaging the vessel 22, such as complementary screw threads or locking tabs with complementary locking slots or an attached hinge 53, to allow the tugging ring to be secured unto the vessel. By using a reversible attachment means, such as screw threads, for connecting the tugging ring to the vessel, the tugging ring may be easily removed by a human to expose the treat cavity and to allow for easy filling of the vessel with treats. Optionally, the tugging device 50 may include dental features 54 that can allow the pet to grasp the tugging device with its teeth. The tugging ring may be made from, among other materials, nylon, plastic, rubber, synthetic rubber, metal, wood.

Figure 9A:
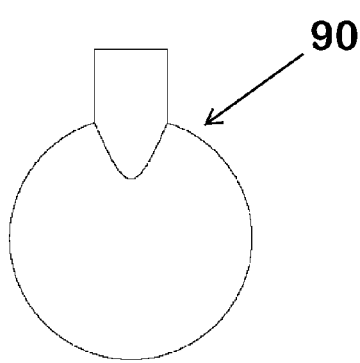
Figure 9B:
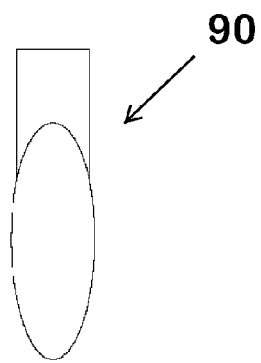
Figure 9C:
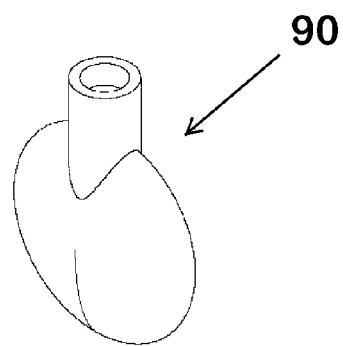

Optionally, the pet toy 10 of the present invention may further include a squeaker 90 or similar noise making device to maintain the attention of the pet. An exemplary squeaker is shown in FIG. 9. As is known in the art, the squeaker may be mounted anywhere within the interior of the pouch.

FIG. 10 shows a first alternative embodiment of the pet toy 110 of the present invention. The alternative embodiment comprises a treat dispenser 120 (not shown), a treat dispenser housing 130, and a flexible bodied cover 140, wherein the treat dispenser housing 130 is exposed to further engage the pet in chewing and playing activities.

Any specific dimensions relevant to the pet toy of the present invention provided herein are for the purpose of demonstrating the invention, but these dimensions are not intended to limit the scope of the invention. It is understood that one skilled in the art may make alterations to the embodiments shown and described herein without departing from the scope of the invention. For example, it is anticipated that the tugging ring may have a variety of shapes other than a ring which would still allow for a pet to expose the vessel of the treat dispenser.

What is claimed is:

1. A pet toy comprising:
a) a pouch with an opening, wherein the pouch defines an interior and an exterior;
b) a treat dispenser housing enveloped in the pouch wherein the treat dispenser housing has a first end positioned in the interior of the pouch and an opened second end secured at the pouch opening with the opened second end exposed to the exterior of the pouch;
b) a treat dispenser comprising a vessel with an opened dispenser end and at least one aperture and a flexible attachment to fixedly attach the treat dispenser within the opened second end of the treat dispenser housing, wherein the treat dispenser is fixedly attached to the treat dispenser housing such that the treat dispenser may be extracted from the treat dispenser housing while remaining attached to the treat dispenser housing; and
c) a pet-engaging device reversibly attached to the opened dispenser end to allow an animal to extract the treat dispenser from the treat dispenser housing.

2. The pet toy of claim 1 wherein the treat dispenser vessel has a closed end opposing the opened dispenser end, and the flexible attachment is attached to the closed end and extending away from the vessel.

3. The treat dispenser of claim 2 wherein the flexible attachment is a sulcated-style spring.

4. The treat dispenser of claim 2 wherein the flexible attachment is a pliable rod.

5. The treat dispenser of claim 2 wherein the vessel comprises a plurality of apertures.

6. The pet toy of claim 1 wherein the treat dispenser housing comprises a hollow chamber having a first end to receive and fixedly attach the flexible attachment and a second end to receive the vessel of the treat dispenser.

7. The pet toy of claim 1 wherein the pet-engaging device is a tugging device.

8. The pet toy of claim 7 wherein the tugging device is in the shape of a ring.

9. The pet toy of claim 7 wherein the tugging device further includes dental features on its surface.

10. The pet toy of claim 7 wherein the pet-engaging device is secured to the treat dispenser by screw threading or locking tabs.

11. The pet toy of claim 1 wherein the pouch is of sufficient dimensions to envelope the treat dispenser housing, and wherein the pouch includes an opening through which the treat dispenser and the pet-engaging device can be engaged with the treat dispenser housing such that the treat dispenser is enclosed within the treat dispenser housing while the pet-engaging device is exposed on the exterior of the pouch.

12. The pet toy of claim 1 wherein the treat dispenser is made from nylon, plastic, rubber, synthetic rubber, metal, or wood.

13. The pet toy of claim 1 wherein the treat dispenser housing is made from nylon, plastic, rubber, synthetic rubber, metal, or wood.

14. The pet toy of claim 1 wherein the pouch is made from cloth, fabric, soft plastic, or rubber material.

15. The pet toy of claim 1 further including at least one squeaker positioned within the pouch.

16. The pet toy of claim 1 wherein the pet-engaging device is secured to the treat dispenser by a hinge.

17. The pet toy of claim 1 wherein a portion of the treat dispenser housing is positioned on the exterior of the pouch.

18. A pet toy comprising:
a) a treat dispenser, comprising a vessel having at least one aperture and a flexible attachment;
b) a treat dispenser housing designed to envelop the treat dispenser and including a means to secure the treat dispenser flexible attachment to the housing such that the treat dispenser can be extracted from the housing while remaining attached to the housing;
c) a body made from cloth, fabric, soft plastic, or rubber material, wherein the body envelops the treat dispenser housing and wherein the body includes an opening allowing access to the treat dispenser housing; and,
d) a tugging device reversibly attached to the vessel of the treat dispenser.

* * * * *